(12) United States Patent
Chu et al.

(10) Patent No.: US 7,027,241 B2
(45) Date of Patent: Apr. 11, 2006

(54) DEFECT MANAGEMENT FOR HDD WITH VARIABLE INDEX ARCHITECTURE

(75) Inventors: Frank R. Chu, Milpitas, CA (US); Steven R. Hetzler, Los Altos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 191 days.

(21) Appl. No.: 10/685,653

(22) Filed: Oct. 14, 2003

(65) Prior Publication Data

US 2005/0078395 A1    Apr. 14, 2005

(51) Int. Cl.
*G11B 5/09* (2006.01)
(52) U.S. Cl. .......................... 360/31; 360/48
(58) Field of Classification Search .................. 360/31, 360/48, 53
See application file for complete search history.

(56) References Cited

U.S. PATENT DOCUMENTS 5,768,044 A * 6/1998 Hetzler et al. ........... 360/77.08
6,134,063 A * 10/2000 Weston-Lewis et al. ...... 360/49
6,185,058 B1 2/2001 Dobbek et al.
2005/0086573 A1* 4/2005 Lambert et al. ............ 714/763

* cited by examiner

*Primary Examiner*—David Hudspeth
*Assistant Examiner*—Varsha A. Kapadia
(74) *Attorney, Agent, or Firm*—Joseph P. Curtin; Eric K. Proul (57) ABSTRACT

A data stream received by a hard disk drive (HDD) is organized into at least one cluster having data blocks and spare data blocks and that is equal in size to an integer multiple of the number of sectors in a track of a disk of the HDD. A variable-index writing technique is used to write each data block of a cluster to a corresponding sector of a track that is encountered by a head when the sector is not defective. A sector of the track is skipped during writing when the sector is defective. The number of spare data blocks in a portion of a cluster corresponding to a single track is reduced by the number of sectors that are skipped in the track so that the number of data blocks plus the number of remaining spare data blocks equals the number of sectors in a track.

24 Claims, 5 Drawing Sheets

| 1 | Sn-2 | Sn-1 | BAD | Sn | SP2 | SP3 | P1 | S1 | S2 | ... | Sn-3 |

| 1 | Sn-2 | Sn-1 | Sn | P1 | SP2 | SP3 | S1 | S2 | S3 | ... | Sn-3 |

DEFECT MANAGEMENT FOR HDD WITH VARIABLE INDEX ARCHITECTURE

BACKGROUND OF THE INVENTION

1. Field of the Invention

The present invention relates to Hard Disk Drive (HDD) systems. More particularly, the present invention relates to a system and method for managing defects in a streaming file HDD system that has been optimized for writing and reading audio and/or visual (audiovisual or AV) data.

2. Description of the Related Art

A Hard Disk Drive (HDD) typically has a plurality of disks. Each disk has a plurality of concentric data tracks that have a common index, which represents the start of each track, and a plurality of physical sectors. Each physical sector has a sector number or address. An HDD that has data formatted and stored on the disks of the HDD in fixed-length (i.e., fixed number of bytes) physical sectors is referred to as a Fixed Block Architecture (FBA) HDD.

Sector-level defect management is performed by an HDD when a sector has a defect that is large enough to significantly impact the readability of the disk. The data affected by such a defect is conventionally re-mapped to a new sector contained in a global spare sector pool. Headerless recording formats used by conventional HDDs provide a Logical Block Address (LBA) access technique that allows any bad physical sector to be mapped into another sector that is part of a global spare sector pool.

The data processing workload of an HDD in a computer data-processing environment is characterized by random access patterns of small blocks of data. In contrast, the data processing workload of an HDD in an audio and/or visual (AV) processing environment is characterized by a dominance of large reads and writes of multiple streams that can be interleaved, interspersed with small reads and writes that may post frequently, but contain only small amounts of data. Interleaving, for example, allows a digital video recorder (DVR) to record and play back real-time television and to record two television programs simultaneously. Use of a global spare pool for sector level defect management tends to adversely impact performance of streaming data applications because additional time is required for accessing the global spare sector pool.

Another characteristic of an AV disk drive is that an AV disk drive may spending a significant amount of time waiting for the disk to rotate until the index is detected by the R/W head before the next write can occur, a situation referred to as rotational latency. A variable-index recording technique, such as disclosed by commonly-assigned application Ser. No. 10/227,494, entitled "Method For Writing Streaming Audio/Visual Data To A Disk Drive", filed Aug. 23, 2002, and incorporated by reference herein, eliminates the adverse impact of rotational latency from performance of a streaming data application. A variable-index recording technique allows a write operation to be performed as soon as the recording head settles on a desired track. The data is written to the first sector encountered in the desired track by creating a virtual index at the first-encountered sector without waiting for the index (i.e., the beginning) of the physical track.

Figure 1:
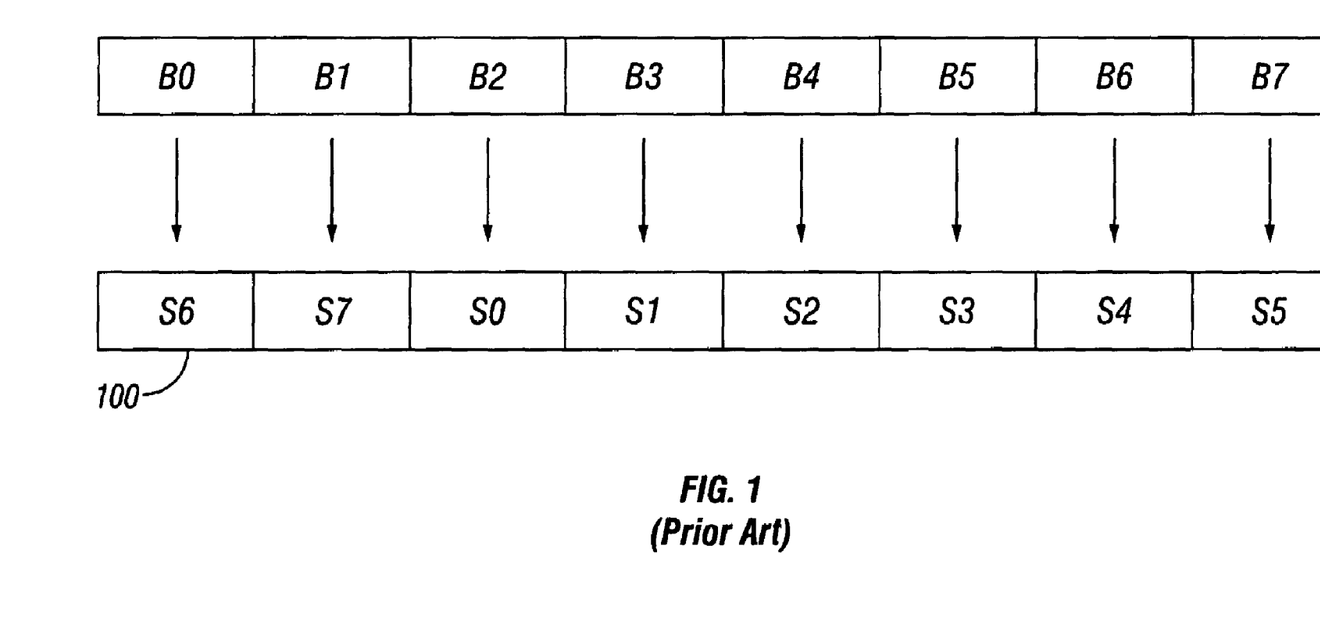
FIG. 1 illustrates an exemplary variable-index recording technique of writing a data cluster of fixed-length logical data blocks to physical sectors of an exemplary data track of an HDD.

FIG. 1 illustrates an exemplary variable-index recording technique of writing a data cluster of fixed-length logical data blocks B0–B7 to physical sectors S0–S7 of an exemplary data track 100 of an HDD. As used herein, a "data cluster" is the basic unit for an AV stream data and is an integer multiple of a full data track on a disk. Accordingly, when the integer multiple is 1, the one full track corresponds to a single AV data cluster. Similarly, when the integer multiple is 4, four full tracks correspond to a single AV data cluster. Thus, all writes of data are full track writes. An AV data cluster is further organized into an integer number of fixed-length data blocks, similar to a conventional FBA format. It follows that the number of data blocks in an AV data cluster is equal to the number of physical sectors in all the tracks forming the data cluster because the cluster is an integer multiple of full tracks. It should be understood that at least one of the data blocks in a cluster can contain error correction information that has been computed from a group of AV data blocks.

Returning to FIG. 1, each logical block B0–B7 is the size of one physical data sector. Blocks B0–B7 are written to data track 100 using a variable-index recording technique, such as disclosed by application Ser. No. 10/227,494. The most efficient implementation of a variable-index recording technique is to use a "full track" data format in which the read/write data is organized by a Hard Disk Controller (HDC) to occupy a whole data track. Another advantage of a full track data format is that a seek operation is reduced because rotational latency is eliminated, thereby increasing the throughput of the entire storage device. Thus, as shown by the example of FIG. 1, block B0 is written to physical sector S6 because physical sector S6 is the first sector that the head encountered after the head settled on track 100. Next, block B1 is written to data sector S7. Then, block B2 is written to data sector S0, and so on, as shown.

Variable-index recording techniques typically use additional track-level Error Correction Code (ECC), such as parity sectors, for handling large defects on the fly. It is, however, desirable to have the ability to allow track-level ECC to handle large soft errors, and allow sparing to handle hard errors.

What is needed is a sector-level defect management technique having local-track sparing for a headerless-format AV HDD that uses a variable-index writing technique.

BRIEF SUMMARY OF THE INVENTION

The present invention provides a sector-level defect management technique having local-track sparing for a headerless-format AV HDD that uses a variable-index writing technique.

The advantages of the present invention are provided by a technique for writing data to a disk drive. The disk drive includes at least one disk and a head for writing data to each disk. Each disk has at least one data track. A head is positioned over a selected data track of a selected disk of the disk drive. The selected data track has a first predetermined number of physical sectors. A second predetermined number of data blocks of a data stream is written to corresponding physical sectors of the selected data track using a variable-index writing technique when the head encounters each physical sector and when the physical sector is not defective, a size of a data block equaling a size of a physical sector. A physical sector of the selected data track is skipped when the physical sector is defective. A third predetermined number of physical sectors of the selected data track is skipped when all data blocks of data stream have been written to the selected data track. The third predetermined number of skipped physical sectors of the selected data track equals the first predetermined number of physical sectors minus a sum of the second predetermined number of data blocks plus the number of skipped defective physical sectors of the data track.

The data stream can be organized into at least one data cluster, such that each data cluster has a size that is equal to a size of an integer multiple of the first predetermined number of physical sectors, and such that a portion of each data cluster corresponds to a single data track and including the second predetermined number of data blocks. The second predetermined number of data blocks of a selected portion of a selected data cluster is written to corresponding physical sectors of the selected data track using a variable-index writing technique when the head encounters each physical sector and when the physical sector is not defective. The third predetermined number of physical sectors is skipped when all data blocks of the selected portion of the selected data cluster have been written to the selected data track. Each portion of a data cluster corresponding to a single data track can include at least one error correction information data block.

When the size of a selected data cluster is greater than a size of a single data track, the second predetermined number of data blocks of a selected portion of the selected data cluster is written to corresponding physical sectors of the selected data track using a variable-index writing technique when the head encounters each physical sector of the selected data track and when the physical sector is not defective. The head is then positioned over a second selected data track having a first predetermined number of physical sectors. The second predetermined number of data blocks of a second selected portion of the selected cluster is written to corresponding physical sectors of the second selected data track using a variable-index writing technique when the head encounters each physical sector and when the physical sector is not defective. A physical sector of the second selected data track is skipped when the physical sector is defective. A fourth predetermined number of physical sectors of the second selected data track is skipped when all data blocks of the second selected portion of the selected data cluster have been written to the second selected data track. The fourth predetermined number of skipped physical sectors of the second selected data track equals the first predetermined number of physical sectors minus a sum of the second predetermined number of data blocks plus the number of skipped defective physical sectors of the second data track.

The present invention uses metadata that is associated with each selected data track for determining whether a physical sector is defective. The metadata that is associated with each selected data track includes information relating to at least one of a number of physical sectors of the selected track, a number of parity sectors on the selected track, and a number of spare sectors on the selected track. Additionally, the metadata that is associated with each selected data track includes information relating to at least one of a stream handle of the data stream, whether the selected track is free or occupied, a starting sector for the selected data track with respect to a physical start of the selected track, and locations of all of the defective sectors on the selected track.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides a headerless-format HDD that uses a variable-index writing technique and a track-local sparing technique, referred to herein as a floating-spare-region sparing technique, for providing sector-level defect management. Unlike conventional sector-level defect management techniques, bad sectors have a fixed relationship with a physical index on a track, and spare sectors have a fixed relationship with the variable-index location.

Figure 2:
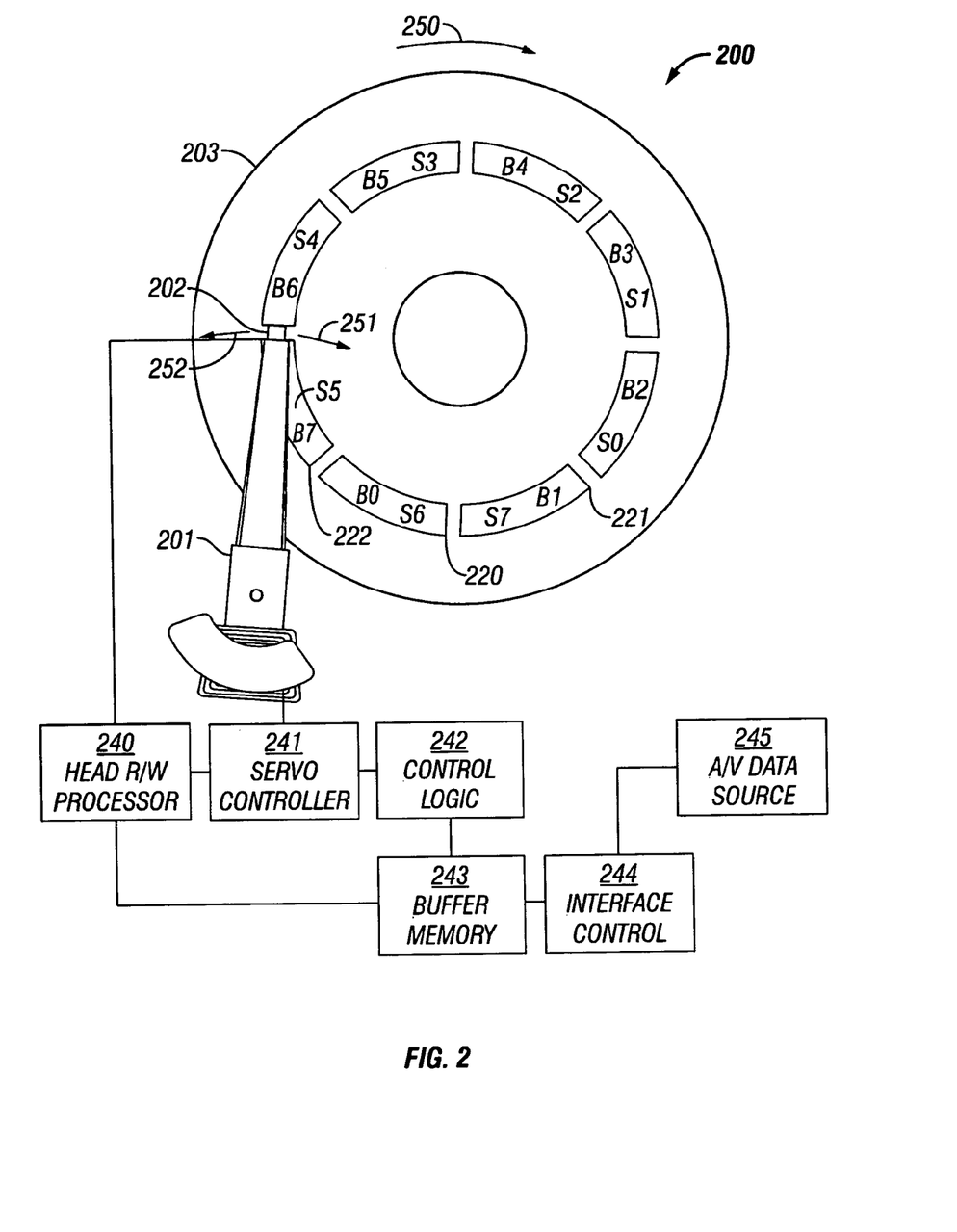
FIG. 2 shows a functional block diagram of an exemplary HDD that utilizes a floating spare region technique for sector-level defect management according to the present invention.

FIG. 2 shows a functional block diagram of an exemplary HDD 200 that utilizes a floating-spare-region sparing technique for sector-level defect management according to the present invention. HDD 200 includes a disk drive actuator arm 201, a read/write (R/W) head 202, a disk 203, a head R/W processor 240, a servo controller 241, a control logic 242, a buffer memory 243 and an interface control 244. Disk 203 rotates clockwise as shown by arrow 250. Disk drive actuator arm 201 positions R/W head 202 over a desired data track of disk 203 by moving R/W head 202 generally radially across disk 203 to the desired data track, as indicated by arrows 251 and 252. An exemplary selected data track containing physical sectors S0–S7 is shown on disk 203. It should be understood that disk 203 includes a plurality of concentric data tracks, of which only the exemplary selected data track is shown for clarity. It should also be understood that HDD 200 can include a plurality of disks, of which only disk 203 is shown in FIG. 2 for clarity.

In an exemplary preferred embodiment, each physical sector number maybe determined from the track number and the servo positioning information. The present invention also utilizes an "indexless" format in which there is no requirement for a physical index mark identifying the beginning of the track. That is, even though there is an initial physical sector number S0 on each track, the physical sector S0 is not used to identify the beginning of a data cluster recorded on the track. When an AV data cluster containing logical blocks B0–B7 is written to a free track, the first data block B0 is written to the first physical sector that is encountered by R/W head 202, thereby minimizing the rotational latency that would occur if the R/W head waited for the track index or for a specific physical sector. A suitable exemplary indexless format is disclosed by application Ser. No. 10/227,494.

When a write operation begins, R/W head 202 is moved to a data track that has been previously identified to control logic 242 as a track having free space. The "seek" to the desired track is performed in a well-known manner by head 202 reading pre-recorded servo positioning information from the disk and head R/W processor 240 signaling the servo controller 241 to move the actuator arm 201 the desired direction and distance.

During a seek operation, a data stream from an AV data source 245, such as a digital TV or a DVR, is transferred through interface controller 244. A host data stream is typically transmitted as a set of data blocks having a starting address and a length. In some streaming systems, such as object- or file-based streams in which the stream command consists of an object identifier, a data set, an offset address and a length, the starting address is the sum of the base address of the identified object plus the offset address. When there are multiple streams, AV data source 245 identifies the data belonging to each stream, such as by using an object identifier.

Control logic 242 organizes a received data stream into clusters having sequential data blocks, which are then loaded into buffer memory 243. Buffer 243 temporarily stores write data received from AV data source 245. In general, the size of buffer 243 will be greater than one cluster. A particular set of data tracks forming a cluster on disk 203 is selected from the set of clusters on disk 203 identified as being empty, and is preferably started on a cluster boundary. Typically, a free-space table contains the set of empty clusters.

A write operation can begin before all the data for a cluster has been received into buffer 243. Thus, when R/W head 202 is positioned over a desired track and settled for writing, the first block B0 of the cluster is written to the first physical sector encountered using a variable-index recording technique. For example, physical sector S6 is shown in both FIGS. 1 and 2 as the first physical sector encountered by R/W head 202 and thus becomes the first sector of the cluster. The remaining cluster data blocks B1–B6 are then written sequentially into physical sectors S7 and S0–S5 until the complete cluster is written into the full track. FIG. 2 shows the situation in which block B7 has not yet been written because physical sector S5 has not yet passed beneath R/W head 202.

According to the floating-spare-region sparing technique of the present invention, spare sectors are preferably arranged to be at the end of the user data on a track. Accordingly, spare sectors have a fixed relationship with the variable-index location, while bad sectors have a fixed relationship with a physical index on a track. For example, consider a data track having 400 physical sectors, starting at physical sector S0, and a data cluster that is 397 data blocks in length, starting with data block B0 and having three spare sectors SP1–SP3. In general, spare sectors SP1–SP3 will have a fixed relationship to the variable-index location. In contrast, any bad sectors will have a fixed relationship to the index of the track. During a data write operation of the exemplary data cluster to the data track, the first user data block B0 may, for example, be written in physical sector S301 of the data track, in which case spare sectors SP1–SP3 would then respectively occur at physical sectors S298, S299 and S300, that is 297 physical sectors after physical sector S301. It is possible that the starting sector location of an adjacent data track might be physical sector S100, in which case the spare sectors would occur at physical sectors S97, S98 and S99.

Figure 3:
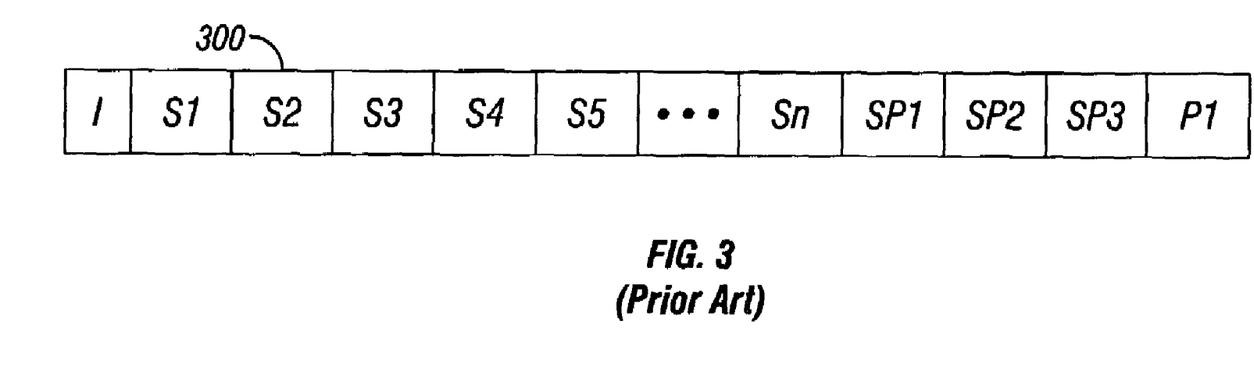
FIG. 3 depicts a generalized exemplary conventional track topology for a data track having three spare sectors.

FIG. 3 depicts a generalized exemplary conventional track topology for a data track 300 having three spare sectors. Data track 300 starts with a physical index I, which is typically part of the servo fields. Physical index I is followed by data sectors S1, S2, ..., Sn, in which n is the number of physical sectors of the track not counting spare sectors and parity sectors. Three spare sectors SP1, SP2 and SP3 follow data sector Sn. Lastly, a parity sector P1 follows spare sectors SP1–SP3. A virtual index will be at physical sector S1.

Figure 4:
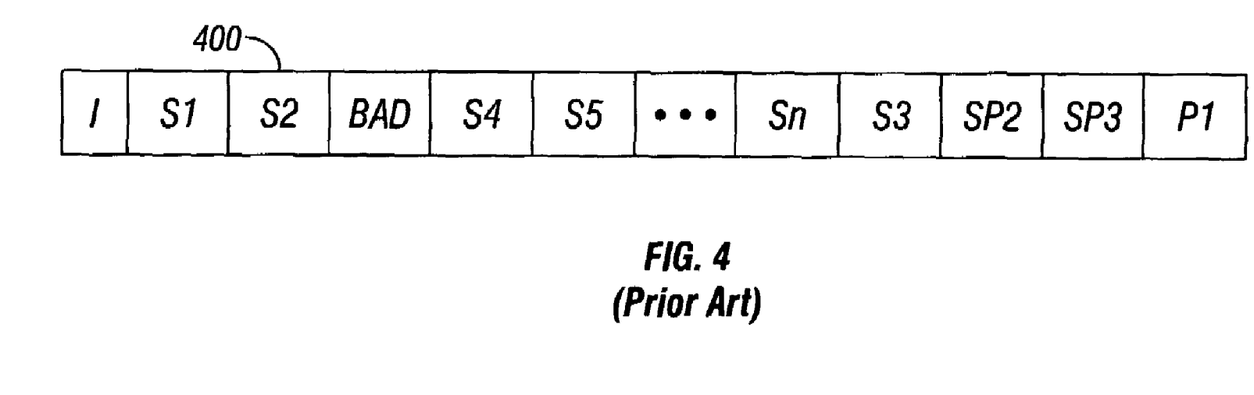
FIG. 4 depicts a conventional reassignment of the contents of bad data sector of a track to a spare sector.

In the situation in which physical sector S3 is bad, a conventional HDC reassigns the content of physical sector S3 into, for example, the physical sector corresponding to spare sector SP1 and marks physical sector S3 as BAD. FIG. 4 depicts a conventional reassignment of the contents of bad physical sector S3 of a track 300 to the physical sector corresponding to spare sector SP1.

According to the present invention, data is written during a write operation using a variable-index writing technique, beginning with the first data sector on which the write head settles. When a defective physical sector is encountered during the write operation, the defective sector is skipped. The writing sequence is resumed immediately after the defector physical sector has been skipped.

Figure 5:
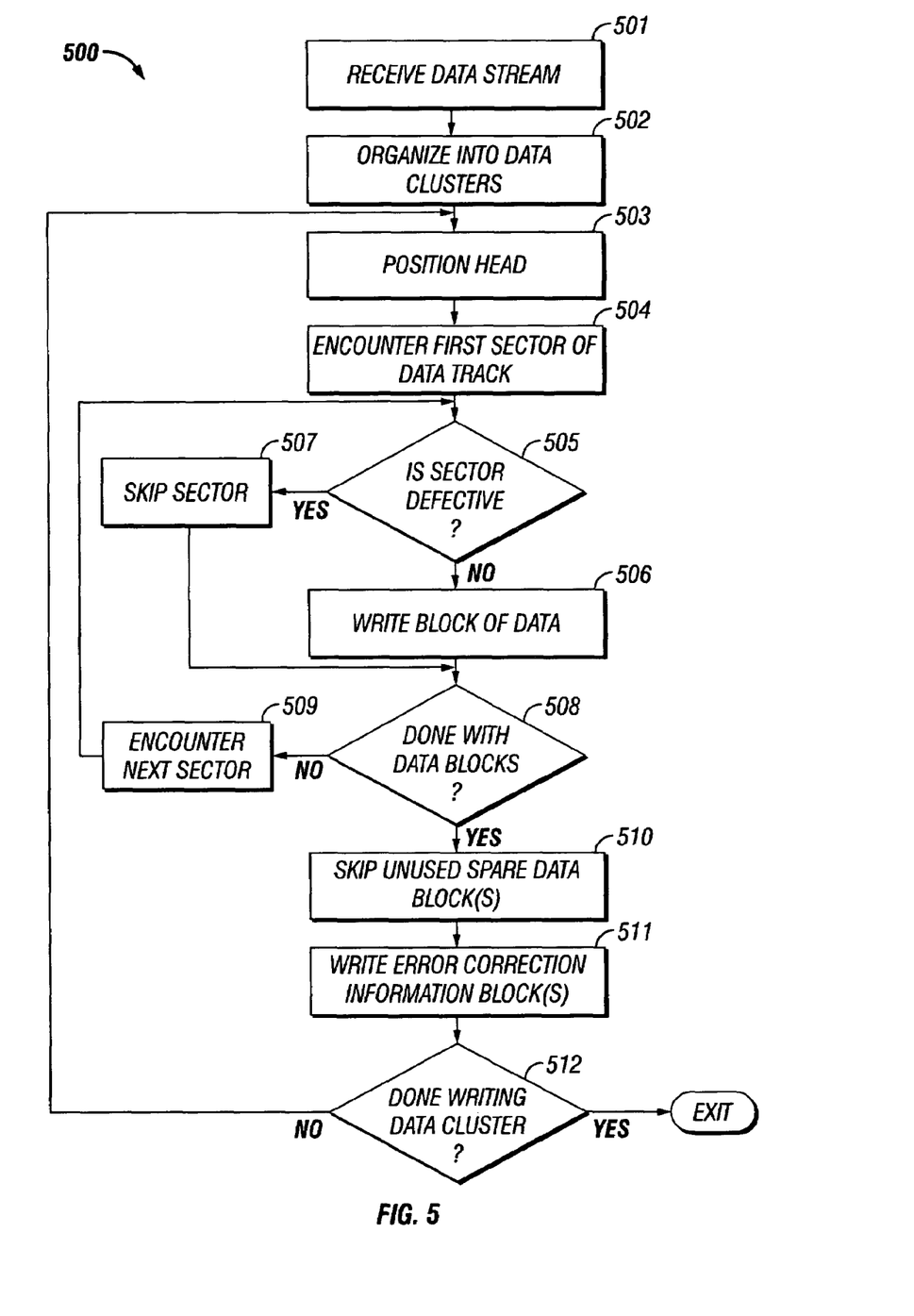
FIG. 5 shows a flow diagram of a floating spare region sparing technique of writing data to a disk according to the present invention.

FIG. 5 shows a flow diagram of an exemplary basic floating spare region sparing technique 500 of writing data to a disk according to the present invention. At step 501, a data stream is received from a host. At step 502, the data stream is organized into at least one data cluster having a size that is equal to an integer multiple of the number of physical sectors in a data track. Each portion of the data cluster that corresponds to a single data track includes data blocks, spare data blocks and error correction information data blocks. The total number of data blocks plus the total number of spare data blocks plus the total number of data blocks containing error correction information in each portion of a data cluster equals the total number of physical sectors in a data track. In the following description of FIG. 5, an exemplary data cluster is chosen to have the same number blocks as there are physical sectors in two data tracks. That is, the exemplary data cluster has two portions that each correspond to a single data track.

At step 503, the head is positioned over a selected data track the disk. At step 504, the first physical sector of the data track is encountered after the head is positioned over the selected data track. At step 505, it is determined whether the first physical sector that is encountered on the data track is defective. If not, flow continues to step 506 and the first data block of the selected portion of the data cluster is written to the first physical sector. At the start of this example, the selected portion of the data cluster is the first portion of the data cluster. Flow continues to step 508. If, at step 505, it is determined that the physical sector is defective, flow continues to step 507 where the physical sector is skipped. Note that each time a physical sector is skipped, one of the spare data sectors at the end of the current portion of the data cluster being written will be reassigned to store a block of data. Flow continues to step 508.

At step 508, it is determined whether all of the data blocks forming the selected portion of the data cluster have been written to the data track. If, at step 508, it is determined that all of the data blocks forming the selected portion of the data cluster have not been written, flow continues to step 509 where the next physical sector is encountered. Otherwise, flow continues to step 505, where the process of determining whether a physical sector is defective and writing a data block to the sector when the sector is not defective or skipping the physical sector when the sector is defective is repeated.

If, at step 508, it is determined that all of the data blocks forming the selected portion of the data cluster have been written, flow continues to step 510 where the number of remaining unused spare data sectors are skipped. Flow continues to step 511 where data blocks containing error correction information are written to successively encountered physical sectors. Flow continues to step 512 where it is determined whether each portion of the data cluster has been written. If not, flow continues to step 503 where the process is repeated for the current portion of the data cluster. If, at step 512, it is determined that each portion of the data cluster has been written, flow ends at step 513.

Figure 6:
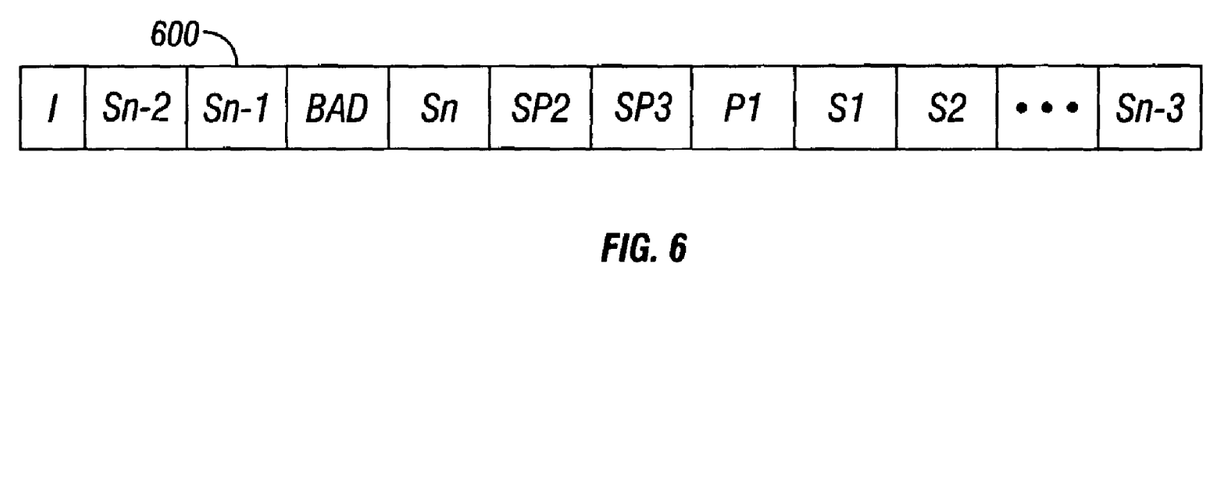
FIG. 6 depicts an exemplary track topology for a data track having spare sectors followed by a parity sector when a floating-spare-region sparing technique according to the present invention is used.

FIG. 6 depicts an exemplary track topology for a data track 600 having spare sectors followed by a parity sector when a floating-spare-region sparing technique according to the present invention is used. As is depicted in FIG. 6, the size of a data cluster equals the number of physical sectors in data track 600. In FIG. 6, the write head settled during the latter part of track 600 and data sectors S1–S$n$–3 were written prior to physical index I. After physical index I, data sectors S$n$–2 and S$n$–1 were written before the BAD physical sector was skipped. Data sector S$n$ was written immediately after the BAD sector. Spare sectors SP2 and SP3 and a parity sector P1 then followed data sector S$n$.

Figure 7:
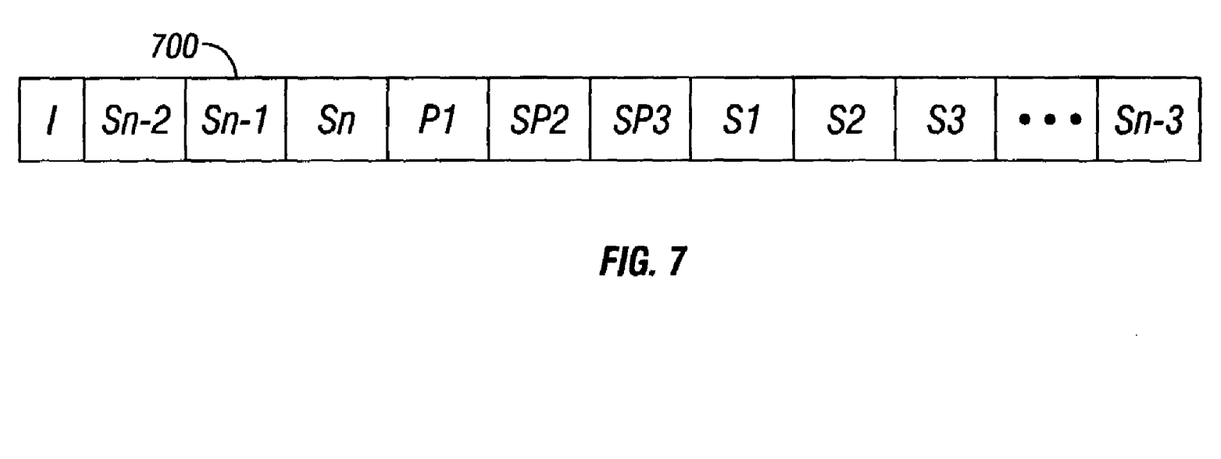
FIG. 7 depicts an alternative exemplary track topology for a data track having a parity sector followed by spare sectors when a floating-spare-region sparing technique according to the present invention is used.

FIG. 7 depicts an alternative exemplary track topology for a data track 700 having a parity sector followed by spare sectors when a floating-spare-region sparing technique according to the present invention is used. As depicted in FIG. 7, the size of a data cluster equals the number of physical sectors in data track 700, data track 700 contains no bad sectors, and the exemplary track topology includes two spare sectors SP1 and SP1 and a single parity sector P1. In FIG. 7, the write head settled during the latter part of track 700 and data sectors S1–S$n$ were written. A parity sector P1 was written immediately after sector S$n$ was written. Spare sectors SP1 and SP2 follow parity sector P1. The topology of track 700 improves system performance, but requires that parity data be computed prior to the completion of writing the last data sector, S$n$. The technique of writing exemplary data track topology 700 is similar to the exemplary basic floating spare region sparing technique 500 shown in FIG. 5, except that steps 510 and 511 are interchanged to produce exemplary data track topology 700.

Variable-index recording typically uses metadata for storing the index location and occupancy information for each track. The present invention expands metadata to include all necessary information for locating defective and spare sectors on each track. For example, the defective physical sector information for each track is stored as the physical sector number from index I. The information identifying the locations of the spare sectors need not be stored directly because the spare sectors can be computed based on the number of allowed spares on the track and the number of defective sectors on the track. Thus, a user sector can be mapped to a physical sector (and the reverse) when the physical sector number and the virtual index location are known in combination with sector defect information.

The sequential nature of streaming data maintains streaming data application performance while also limiting the amount of RAM that is required for holding metadata. A buffer is used for each read stream for holding the metadata for the next N tracks in a stream. For example, when N=20, the streaming throughput is only impacted at a 5% level because a metadata access is only required every 20 data tracks. For write streams, a similar buffer holds metadata for the next N free tracks. Accordingly, metadata for N=20 tracks for a write stream has similar minimal impact on streaming data application performance.

The drive maintains the metadata that is associated with the tracks. The metadata that is common to sets of tracks includes the number of physical sectors per track, which is constant for each zone, the number of parity sectors on a track, and the number of spare sectors on a track. Other information that is maintained by the drive that is specific to individual tracks includes the associated stream handle, a track free/occupied indicator, which may be a reserved stream handle value, the starting sector for a data track with respect to the physical start of the track, and locations of all of the defective sectors on the track (e.g., as a list or a bitmap). The metadata is modified in response to stream allocation events, such as stream creation, stream deletion, and stream modification. Further, when dynamic allocation is used during stream writing, the metadata is modified accordingly.

When writing a data stream, the drive allocates a set of tracks for holding the write data. Any allocation method may be used, such as a file allocation table (FAT), that can provide a set of unoccupied tracks. Once the tracks have been allocated, data is written to the allocated tracks sequentially. Prior to writing a track, the drive determines the set of non-defective sectors from the metadata associated with the track. When writing the track, the drive records the starting data sector number of the first non-defective sector available for writing data. Subsequent sectors on the track are written if they are non-defective, otherwise a defective sector is skipped. After all the data for the track has been written, the parity sectors are written into the subsequent data sectors. The contents of the parity sectors are computed prior to being written. While parity sectors have been referred herein as parity sectors, the contents may be computed using any suitable error or erasure correcting code. For example, a single parity sector may be computed using simple parity, and a pair of parity sectors may be computed using an EVENODD code, and a Reed Solomon code may be used for computing larger numbers of parity sectors.

Once the track has been written, any remaining non-defective sectors will be allocated as spare sectors. Their location and number may be determined from the number of sectors on the track and the number of defective sectors on the track. The metadata is then updated with the saved starting-sector location, the stream handle, and the track-free status. As previously mentioned previously, metadata updates from a set of tracks may be grouped together into a single update operation, thereby minimizing the impact on performance.

When reading a stream, the drive determines the set of tracks that is associated with the stream. Once the tracks have been determined, data is read from the tracks sequentially. Prior to reading the track, the drive also determines the set of non-defective sectors from the metadata that is associated with the track and the starting data sector number. When reading the track, the drive starts reading at the first non-defective sector available for reading data. Subsequent sectors on the track will be read if non-defective and non-spare; otherwise, defective and spare sectors are skipped. The data sectors are stored in buffer locations based on their respective stream sector numbers (i.e., the number from the starting data sector on the track). When all of the data sectors are read successfully, then the drive has successfully read the track, and can transfer the data to the host. When any data sectors can not be read, their contents are reconstructed from the remaining data and the parity sectors.

Once the operation is complete, then the track has been successfully read and the data can be transferred to the host.

The metadata buffer size savings provided by the present invention are significant in comparison to conventional approaches. With conventional headerless defect mapping, the RAM requirements scale linearly with the number of defects on the drive, and sublinearly with the total number of sectors on the drive. For the present invention, the metadata buffer size requirements scale with the number of defects allowed on a track, and the number of tracks identified by metadata.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for writing data to a disk drive, the disk drive having at least one disk and a head for writing data to each disk, and each disk having at least one data track, the method comprising steps of:
  positioning a head over a selected data track of a selected disk of the disk drive, the selected data track having a first predetermined number of physical sectors;
  writing a second predetermined number of data blocks of a data stream to corresponding physical sectors of the selected data track using a variable-index writing technique when the head encounters each physical sector and when the physical sector is not defective, a size of a data block equaling a size of a physical sector;
  skipping a physical sector of the selected data track when the physical sector is defective;
  skipping a third predetermined number of physical sectors of the selected data track when all data blocks of data stream have been written to the selected data track and writing at least one error correction information data block as a part of the second predetermined number of data blocks, the third predetermined number of skipped physical sectors of the selected data track equaling the first predetermined number of physical sectors minus a sum of the second predetermined number of data blocks plus the number of skipped defective physical sectors of the data track.

2. The method according to claim 1, wherein at least one error correction information data block is sequentially prior to a first spare data block.

3. The method according to claim 1, wherein at least one error correction data block is sequentially after a last spare data block.

4. The method according to claim 1, wherein at least one disk of the disk drive has a plurality of data tracks each having the first predetermined number of data sectors,
  the method further comprising a step of organizing the data stream into at least one data cluster, each data cluster having a size that is equal to a size of an integer multiple of the first predetermined number of physical sectors, a portion of each data cluster corresponding to a single data track and including the second predetermined number of data blocks,
  wherein the step of writing the second predetermined number of data blocks writes the second predetermined number of data blocks of a selected portion of a selected data cluster to corresponding physical sectors of the selected data track using a variable-index writing technique when the head encounters each physical sector and when the physical sector is not defective, and
  wherein the step of skipping the third predetermined number of physical sectors skips the third predetermined number of physical sectors when all data blocks of the selected portion of the selected data cluster have been written to the selected data track.

5. The method according to claim 4, wherein each portion of a data cluster corresponding to a single data track further includes at least one error correction information data block, and
  wherein the step of skipping the third predetermined number of physical sectors includes a step of writing each error correction information data block of a data cluster to a physical sector allocated as a spare sector.

6. The method according to claim 4, wherein the size of a selected data cluster is greater than a size of a single data track,
  wherein the step of writing the second predetermined number of data blocks writes the second predetermined number of data blocks of a selected portion of the selected data cluster to corresponding physical sectors of the selected data track using a variable-index writing technique when the head encounters each physical sector of the selected data track and when the physical sector is not defective,
  the method further comprising steps of:
  positioning the head over a second selected data track having a first predetermined number of physical sectors;
  writing the second predetermined number of data blocks of a second selected portion of the selected cluster to corresponding physical sectors of the second selected data track using a variable-index writing technique when the head encounters each physical sector and when the physical sector is not defective;
  skipping a physical sector of the second selected data track when the physical sector is defective;
  skipping a fourth predetermined number of physical sectors of the second selected data track when all data blocks of the second selected portion of the selected data cluster have been written to the second selected data track, the fourth predetermined number of skipped physical sectors of the second selected data track equaling the first predetermined number of physical sectors minus a sum of the second predetermined number of data blocks plus the number of skipped defective physical sectors of the second data track.

7. The method according to claim 4, wherein each portion of a data cluster corresponding to a single data track further includes a fourth predetermined number of error correction information data blocks, and
  wherein the step of skipping the third predetermined number of physical sectors includes a step of writing at least one error correction information data block to a physical sector corresponding to a spare sector.

8. The method according to claim 7, wherein at least one error correction information data block corresponds to a first spare data block.

9. The method according to claim 7, wherein at least one error correction data block corresponds to a last spare data block.

10. The method according to claim 1, further comprising a step of determining whether a physical sector is defective is based on information contained in metadata that is associated with the selected data track.

11. The method according to claim 10, wherein the metadata that is associated with the selected data track includes information relating to at least one of a number of physical sectors of the selected track, a number of parity sectors on the selected track, and a number of spare sectors on the selected track 12. The method according to claim 10, wherein the metadata that is associated with the selected data track includes information relating to at least one of a stream handle of the data stream, whether the selected track is free or occupied, a starting sector for the selected data track with respect to a physical start of the selected track, and locations of all of the defective sectors on the selected track.

13. A disk drive, comprising:
at least one disk, each disk having at least one data track and each data track having a first predetermined number of physical sectors; and
a head writing a second predetermined number of data blocks of a data stream to corresponding physical sectors of the selected data track using a variable-index writing technique when the head encounters each physical sector and when the physical sector is not defective, a size of a data block equaling a size of a physical sector, the head skipping a physical sector of the selected data track when the physical sector is defective, and skipping a third predetermined number of physical sectors of the selected data track when all data blocks of data stream have been written to the selected data track and the head further writes at least one error correction information data block as part of the second predetermined number of data blocks, the third predetermined number of skipped physical sectors of the selected data track equaling the first predetermined number of physical sectors minus a sum of the second predetermined number of data blocks plus the number of skipped defective physical sectors of the data track.

14. The disk drive according to claim 13, wherein at least one error correction information data block is sequentially prior to a first spare data block.

15. The disk drive according to claim 13, wherein at least one error correction data block is sequentially after a last spare data block.

16. The disk drive according to claim 13, wherein at least one disk of the disk drive has a plurality of data tracks each having the first predetermined number of data sectors,
wherein the data stream is organized into at least one data cluster, each data cluster having a size that is equal to a size of an integer multiple of the first predetermined number of physical sectors, a portion of each data cluster corresponding to a single data track and including the second predetermined number of data blocks, and
wherein the head writes the second predetermined number of data blocks of a selected portion of a selected data cluster to corresponding physical sectors of the selected data track using a variable-index writing technique when the head encounters each physical sector and when the physical sector is not defective, and the head skips the third predetermined number of physical sectors when all data blocks of the selected portion of the selected data cluster have been written to the selected data track.

17. The disk drive according to claim 16, wherein each portion of a data cluster corresponding to a single data track further includes at least one error correction information data block, and
wherein the head writes each error correction information data block of a data cluster to a physical sector allocated as a spare sector.

18. The disk drive according to claim 16, wherein the size of a selected data cluster is greater than a size of a single data track,
wherein the head writes the second predetermined number of data blocks of a selected portion of the selected data cluster to corresponding physical sectors of the selected data track using a variable-index writing technique when the head encounters each physical sector of the selected data track and when the physical sector is not defective,
wherein the head is positioned over a second selected data track having a first predetermined number of physical sectors and writes the second predetermined number of data blocks of a second selected portion of the selected cluster to corresponding physical sectors of the second selected data track using a variable-index writing technique when the head encounters each physical sector and when the physical sector is not defective, skips a physical sector of the second selected data track when the physical sector is defective and skips a fourth predetermined number of physical sectors of the second selected data track when all data blocks of the second selected portion of the selected data cluster have been written to the second selected data track, the fourth predetermined number of skipped physical sectors of the second selected data track equaling the first predetermined number of physical sectors minus a sum of the second predetermined number of data blocks plus the number of skipped defective physical sectors of the second data track.

19. The disk drive according to claim 16, wherein each portion of a data cluster corresponding to a single data track further includes a fourth predetermined number of error correction information data blocks, and
wherein the head writes at least one error correction information data block to a physical sector corresponding to a spare sector.

20. The disk drive according to claim 19, wherein at least one error correction information data block corresponds to a first spare data block.

21. The disk drive according to claim 19, wherein at least one error correction data block corresponds to a last spare data block.

22. The disk drive according to claim 13, wherein information relating to whether a physical sector is defective is contained in metadata that is associated with the selected data track.

23. The disk drive according to claim 22, wherein the metadata that is associated with the selected data track includes information relating to at least one of a number of physical sectors of the selected track, a number of parity sectors on the selected track, and a number of spare sectors on the selected track 24. The disk drive according to claim 22, wherein the metadata that is associated with the selected data track includes information relating to at least one of a stream handle of the data stream, whether the selected track is free or occupied, a starting sector for the selected data track with respect to a physical start of the selected track, and locations of all of the defective sectors on the selected track.

* * * * *